March 17, 1953 — A. L. BRANDENBURG — 2,631,518
AUTOMOBILE VENTILATOR
Filed Jan. 16, 1950 — 2 SHEETS—SHEET 1
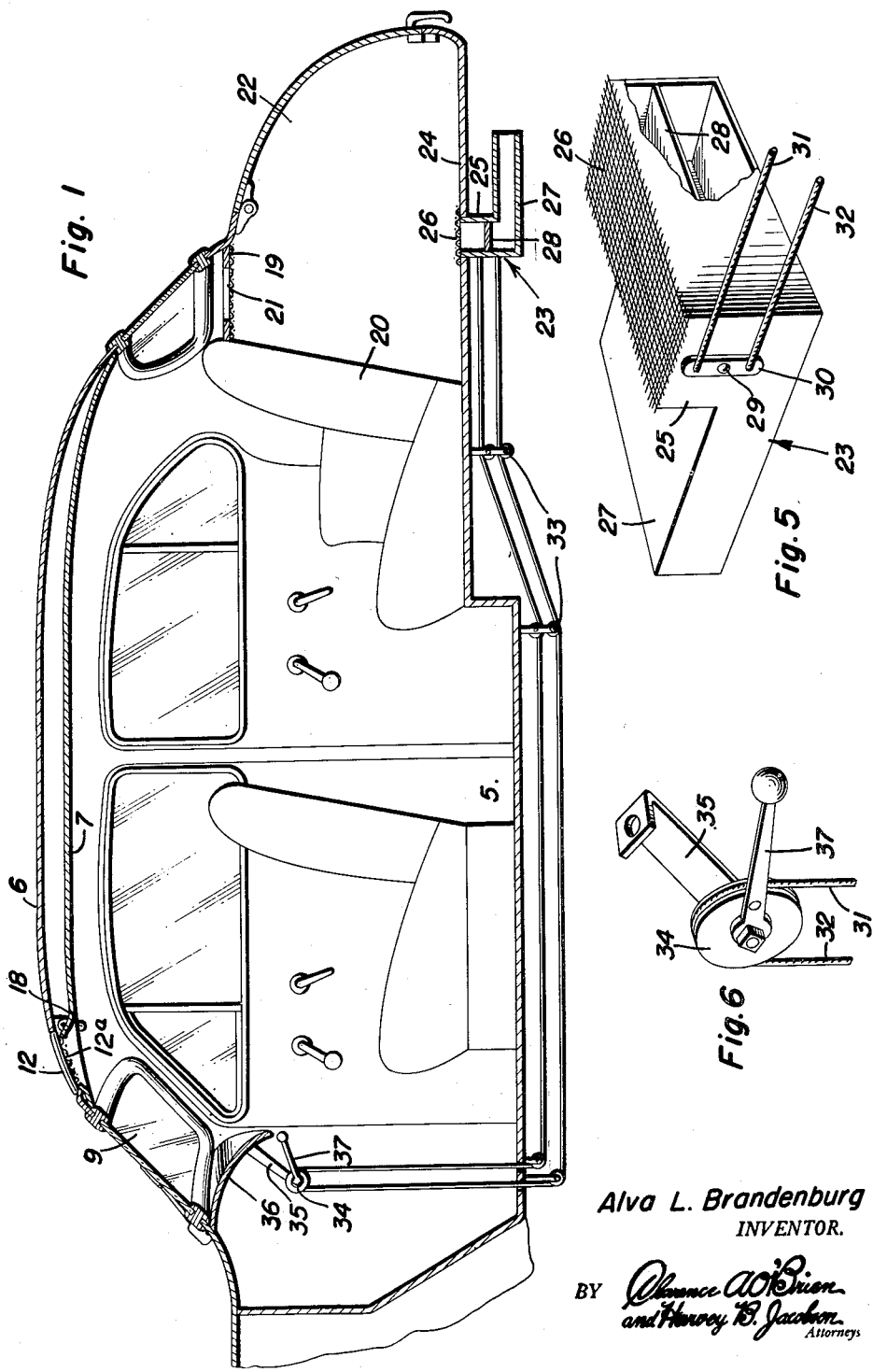
Alva L. Brandenburg
INVENTOR.
BY Clarence A. O'Brien
and Harvey B. Jacobson
Attorneys March 17, 1953  A. L. BRANDENBURG  2,631,518
AUTOMOBILE VENTILATOR
Filed Jan. 16, 1950  2 SHEETS—SHEET 2
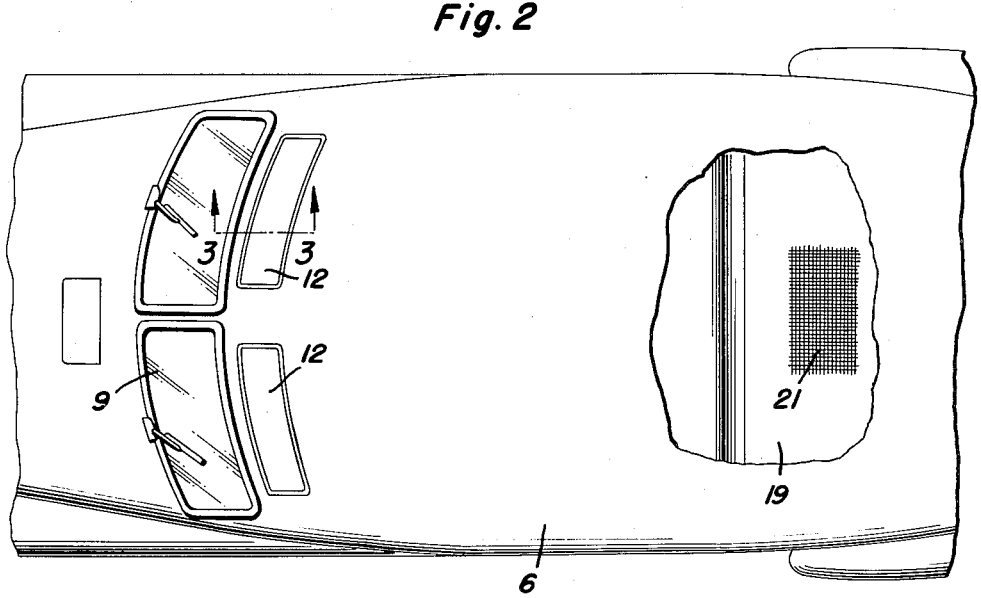
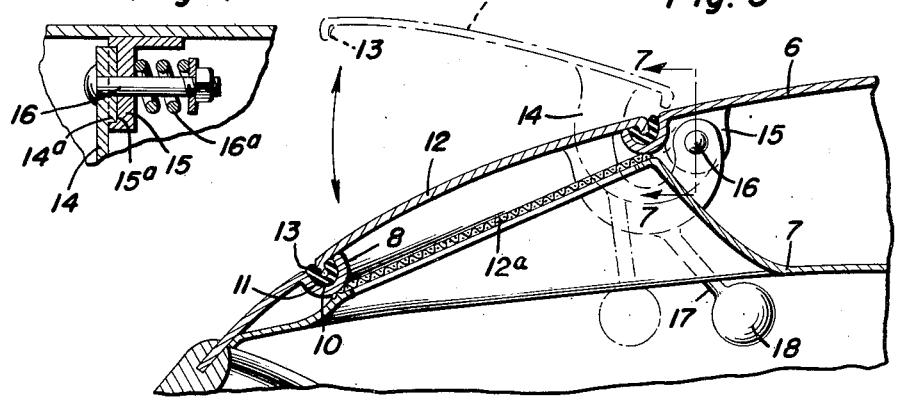
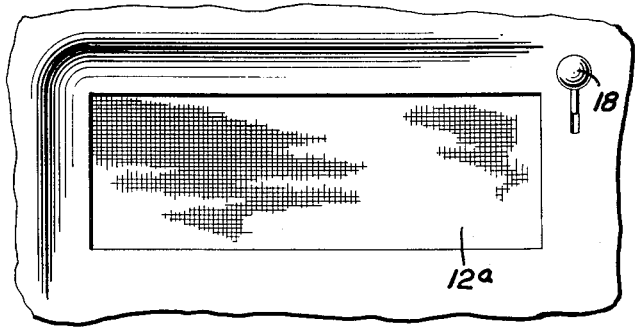
Alva L. Brandenburg
INVENTOR.

Patented Mar. 17, 1953

2,631,518

UNITED STATES PATENT OFFICE 2,631,518

AUTOMOBILE VENTILATOR

Alva L. Brandenburg, Norfolk, Nebr.

Application January 16, 1950, Serial No. 138,894

1 Claim. (Cl. 98—2)

The present invention relates to new and useful improvements in ventilators for automobiles, and more particularly to the provision of an air inlet in the front of the automobile body above the windshield admitting fresh air and providing an outlet at the rear of the automobile in the shelf immediately behind the rear seat whereby air may be circulated immediately under the top of the automobile and out through the trunk by way of an outlet in the bottom of the trunk.

An object of the invention is to provide a door for the air inlet to function as a scoop when in open position to supply fresh air to the interior of the automobile at its front end and to provide a control for the outlet in the bottom of the trunk operated by a handle within convenient reach by an occupant of the front seat of the automobile to regulate the volume of air circulated therethrough.

A further object of the invention is to construct the outlet in the bottom of the trunk with a rearwardly extending suction passage whereby suction created at the rear end of the passage by the momentum of the automobile will serve to draw air out of the automobile body independently of the circulation of air therethrough by the opening of the door for the inlet.

A still further object is to provide an apparatus of this character of simple and practical construction, which is efficient and reliable in operation, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a longitudinal sectional view of an automobile body showing the ventilator installed therein;

Figure 2 is a top plan view with parts broken away and shown in section;

Figure 3 is an enlarged sectional view of the air inlet at the front of the automobile body taken substantially on the line 3—3 of Figure 2;

Figure 4 is a rear elevational view of the air inlet;

Figure 5 is an enlarged perspective view of the outlet chamber for the bottom of the trunk of the automobile;

Figure 6 is an enlarged perspective view of the control handle for the outlet; and Figure 7 is an enlarged sectional view of the locking means for the inlet door handle and taken on a line 7—7 of Figure 3.

Referring now to the drawings in detail wherein, for the purpose of illustration, I have disclosed a preferred embodiment of the invention, the numeral 5 designates generally an automobile body including a top 6 and lining 7 for the top.

One or more air inlet openings 8 are provided in the front portion of top 6 immediately above the windshield 9, the edges of the opening being formed with a rain trough 10 having a rubber lining 11.

A door 12 is formed at its edges with a downturned lip 13 closely fitted in the lining 11 to seal the same, the door being provided adjacent its rear edge with an arcuate arm 14 which extends downwardly through the opening 8 and is pivoted at its inner end to a bracket 15 at the under side of top 6 by means of a pivot pin 16 for swinging the front edge of door 12 vertically into its open or closed position. The arm 14 and bracket 15 are formed with interlocking beveled teeth 14a and grooves 15a held in engaged relation by a coil spring 16a on pin 16 behind bracket 15. A handle 17 projects from arm 14 to the interior of the body 5 and is provided with a hand gripping knob 18 to facilitate opening and closing of the door 12.

The lining 7 under the top 6 of the automobile is provided with a bug screen 12a immediately under opening 8.

The body 5 is constructed with a shelf 19 immediately behind rear seat 20 and the shelf is provided with a screened opening 21 to admit air circulated in the body of the car into the trunk 22.

A casing forming an outlet chamber designated generally at 23 is suitably secured to the bottom 24 of the trunk, chamber 23 including a vertical front end portion 25 projecting upwardly through bottom 24 and provided with a screen 26 at its top and a horizontal passage 27 extends from the lower end of vertical portion 25 in a rearward direction.

A butterfly type valve 28 is provided with a shaft 29 which is pivoted in the sides of vertical portion 25 of chamber 23, the outer end of the shaft having a cross bar 30 secured thereto and to the ends of which the ends 31 and 32 of flexible wires or cables are attached. The wires or cables extend forwardly under body 5 over pulleys 33 and upwardly into the body and coiled one or more times around a grooved wheel or pulley 34 journaled on a bracket 35 secured to the underside of dash or instrument panel 36. A handle 37 is attached to pulley 34 to turn the latter to pull the ends 31 and 32 of the cables in opposite directions to open and close valve 28.

In the operation of the device, air admitted to the front end of the body of the vehicle passes rearwardly, the current of air moving closely under the top to remove any warm foul air pocketed under the top and is discharged outwardly through the opening in rear shelf 19 into the trunk 22 and out through the chamber 23 in the bottom of the trunk under control of valve 28.

The air pocketed in the top of the car may also be withdrawn when door 12 for inlet opening 8 is closed and opening valve 28 to create a suction in chamber 23 by the momentum of the car.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A vehicle ventilator comprising the combination of a vehicle body having an air inlet at its upper front portion, a door for the inlet forming an air scoop when in open position, a shelf in the vehicle behind the rear seat thereof and closing a part of the top of a trunk compartment, an air outlet in the shelf for passage of air from the body to the trunk compartment, an air outlet in the bottom of the trunk compartment, a casing forming a chamber connected to the last-named outlet and having a rearwardly extending passage leading to the atmosphere, a valve disposed in said casing and arranged to control the flow of air through said passage, a valve operating member connected to said valve and disposed within the vehicle body for manual valve control from within the vehicle body, the vehicle body being provided with a floor, said valve operating member including a pair of flexible cables located below said vehicle body floor, said vehicle body floor being provided with a pair of apertures and said cables extending through said apertures, means disposed in the front part of said body for actuating said cables, and guides engaged with the cables and located beneath said floor to support said cables.

ALVA L. BRANDENBURG.

REFERENCES CITED

The following references are of record in the file of this patent:

UNITED STATES PATENTS

| Number | Name | Date |
| --- | --- | --- |
| 1,846,552 | Haskins | Feb. 23, 1932 |
| 2,087,651 | Mygland | July 20, 1937 |
| 2,159,516 | Ball | May 23, 1939 |
| 2,248,329 | Bell | July 8, 1941 |
| 2,304,643 | Hans | Dec. 8, 1942 |

FOREIGN PATENTS

| Number | Country | Date |
| --- | --- | --- |
| 463,650 | Great Britain | Apr. 5, 1937 |
| 476,787 | Great Britain | Dec. 15, 1937 |
| 852,716 | France | Nov. 9, 1939 |